(12) United States Patent
DeSmet et al.

(10) Patent No.: US 10,897,993 B2
(45) Date of Patent: Jan. 26, 2021

(54) CABINET ASSEMBLY

(71) Applicant: Crawford & Burke Company Limited, Kowloon (HK)

(72) Inventors: Albert Jean DeSmet, Laguna Hills, CA (US); Justin Albert DeSmet, Laguna Hills, CA (US)

(73) Assignee: Crawford & Burke Company Limited, Kowloon (HK)

( * ) Notice: Subject to any disclaimer, the term of this patent is extended or adjusted under 35 U.S.C. 154(b) by 0 days.

(21) Appl. No.: 16/123,984

(22) Filed: Sep. 6, 2018

(65) Prior Publication Data

US 2019/0072122 A1 Mar. 7, 2019

Related U.S. Application Data

(60) Provisional application No. 62/554,902, filed on Sep. 6, 2017.

(51) Int. Cl.
| | |
|---|---|
| A47B 47/00 | (2006.01) |
| F16B 12/10 | (2006.01) |
| F16B 5/00 | (2006.01) |
| A47B 13/00 | (2006.01) |
| A47B 61/00 | (2006.01) |
| A47B 55/00 | (2006.01) |
| A47B 63/00 | (2006.01) |
| F16B 12/46 | (2006.01) |

(52) U.S. Cl.
CPC ............ *A47B 47/00* (2013.01); *F16B 5/0032* (2013.01); *F16B 12/10* (2013.01); *A47B 13/003* (2013.01); *A47B 55/00* (2013.01); *A47B 61/00* (2013.01); *A47B 63/00* (2013.01); *A47B 2230/0077* (2013.01); *A47B 2230/0081* (2013.01); *F16B 2012/103* (2013.01); *F16B 2012/466* (2013.01)

(58) Field of Classification Search
CPC . A47B 47/00; A47B 47/0025; A47B 47/0075; A47B 47/0091; A47B 47/04; A47B 47/042; A47B 47/047; A47B 2230/0033; A47B 2230/0029; A47B 2230/0092; A47B 2230/16; A47B 2230/0037; A47B 55/00; A47B 61/00; F16B 2012/103
See application file for complete search history.

(56) References Cited

U.S. PATENT DOCUMENTS

| | | | | |
|---|---|---|---|---|
| 3,343,853 | A * | 9/1967 | Stute | A47B 47/042 403/263 |
| 3,347,610 | A * | 10/1967 | Pilliod | A47B 47/04 312/108 |
| 3,403,641 | A * | 10/1968 | Baker | A47B 47/042 108/152 |

(Continued)

*Primary Examiner* — Andrew M Roersma
(74) *Attorney, Agent, or Firm* — Williams Mullen; F. Michael Sajovee (57) ABSTRACT

A kit is provided that, when assembled, forms a unit of furniture. The kit includes side panels that can reversibly slide into an opening formed in the sides of the front and side panels. The kit may include multiple locking pins and cleats to restrict movement of the top and side panels. The kit may include positioning wedges and/or locking wedges to restrict relative movement of the panels and thus improve the stability of the unit. Also provided are methods of assembling the unit of furniture.

17 Claims, 7 Drawing Sheets

(56) References Cited

U.S. PATENT DOCUMENTS

| | | | | |
|---|---|---|---|---|
| 3,675,293 | A | * | 7/1972 | Hajduk .................. A47B 47/00 29/407.1 |
| 5,419,628 | A | * | 5/1995 | Myslinski, Jr. ..... A47B 47/0075 16/252 |
| 6,652,206 | B2 | * | 11/2003 | Heflin ................. F16B 19/1081 411/344 |
| 2008/0074014 | A1 | * | 3/2008 | Ho ....................... A47B 17/006 312/195 |
| 2010/0079045 | A1 | * | 4/2010 | Yeh ........................ A47B 47/04 312/263 |
| 2011/0115350 | A1 | * | 5/2011 | Tsai ....................... A47B 43/00 312/262 |
| 2011/0260592 | A1 | * | 10/2011 | Lin ...................... A47B 47/042 312/265.5 |
| 2013/0127316 | A1 | * | 5/2013 | Wu ........................ A47B 43/00 312/258 |

* cited by examiner

CABINET ASSEMBLY

CROSS REFERENCE TO RELATED APPLICATIONS

This application claims the benefit of priority to U.S. Provisional Application No. 62/554,902 filed Sep. 6, 2017, the contents of which are incorporated herein in their entirety by reference.

FIELD

The present disclosure relates to quick assembly furniture and hardware, and more particularly to a cabinet, table, storage unit or other item of furniture with a substantial open volume when fully assembled that requires minimal volume when disassembled and may be quickly assembled without, or with minimal, use of tools.

BACKGROUND

Quick assembly furniture has become quite popular. Manufacturers of such furniture are called upon to offer inexpensive and easy-to-assemble furniture to consumers. Some furniture demanded by consumers, such cabinets, tables, storage units or other item of furniture with a substantial open volume when fully assembled, can be quite bulky and require a large container volume in order to be shipped pre-assembled. In an effort to provide cost savings to consumers, manufacturers of quick assembly furniture seek ways to ship the furniture in as compact a condition and as inexpensively as possible.

In order to keep shipping costs down, furniture is often shipped in multiple components that must be unpacked assembled by the consumer upon arrival. Because the consumer must generally attach various hardware to the furniture components during assembly, the consumer is generally required to use tools and must, at times, follow complicated assembly instructions. Assembly performed by the consumer may not be as stable as factory assembly, due to consumer error, superior factory assembly processes and equipment versus those normally available to or used by consumers, and damage to components and hardware during shipping and attempted assembly. Additionally, once the furniture is assembled, it may be impossible or difficult to disassemble the furniture without damaging the components. Stability of assembly is a critical element of consumer acceptance of the product.

The consumer must also possess the necessary know-how to assemble the furniture components. This means being able to read and follow any assembly instructions sent with the components. At times, these assembly instructions may be complicated and/or confusing, even if preparation of those instructions is given substantial consideration by the manufacturer (e.g., IKEA.) At times, the assembly instructions may not be included with the kit or may be lost during shipment. At times, the language(s) of the assembly instructions may not be written in the language of the consumer, or the manual is prepared in a foreign language and not professionally translated, or written by a non-native speaker of the language. Further, these instructions may be solely in the form of pictograms, without language, calling on the consumer to be skilled in the interpretation of such documents. These situations may lead to the consumer adopting a trial-and-error method to determine the correct configuration of the components. The consumer may become frustrated, waste time and energy building the wrong configuration, or may end with a sub-optimal unit due to less-than-optimal placement of all the components, or wear of components due to the trial-and-error process.

To avoid these problems, the conventional approach calls for the manufacturer to assemble the unit prior to shipment. This assembly results in considerable open internal and wasted shipping volume, resulting in substantially higher shipping costs, and therefore dramatically increases the costs of goods sold. This is especially the case where goods are shipped from overseas, or to consumers using domestic delivery methods, such as UPS, FEDEX or Parcel Post.

A further aspect of prior art approaches is that consumers may damage portions of the furniture components, either during assembly and disassembly, or simply during the every day use of the article of furniture. Such articles are often fabricated using materials such as particle board or medium density fiberboard (MDF), for example. Conventionally, the fully assembled product is a rigid item of furniture, suited for its designed purpose. However, these materials of construction may be vulnerable to failure when stresses are applied to connection points or joints. A joint is the close intersection, securing, or fastening together of two or more surfaces (usually smooth, even surfaces)—and customarily a furniture joint is rigid. With furniture sold in assembled form, joints are typically secured by dowels, dovetails, dados, glue blocks, rabbets, etc. In kit or knock-down furniture, joints are commonly made rigid by custom connecting fasteners, connector bolts, or through-bolts mating with fixed nuts. A disadvantage with this approach is that the improper positioning of fastening elements during assembly may result in weakened connection points or joints. In addition, rigid designs may result in the imposition of full stress of use on even properly positioned connection points or joints, possibly leading to failure of or weakening of connections. Kit or knock-down may be relocated or disassembled for transport by the consumer after purchase, and the joints may become weak points for receiving stress due to disassembly, transportation and reassembly. It would be desirable to provide a kit of furniture adapted to such stress, while still amenable to easy assembly and disassembly.

There remains a need to simplify the process of assembling furniture while retaining the ability to ship the furniture components using minimum shipping volume. There also remains a need to create furniture that can be easily disassembled for transport to other locations.

BRIEF SUMMARY

The present disclosure relates to a knock-down furniture kit that, when assembled, forms a unit of furniture. Under the present approach, the kit includes panels that may be connected using various combinations of mating grooves, wedges, locking pins, and cleats. Although specific embodiments of the present approach are described herein, it should be appreciated that the various components, configurations, and features may be combined to form other embodiments not shown herein but nonetheless not depart from the present approach.

In the demonstrative embodiment disclosed herein, the kit comprises: a back panel, a top panel, a base panel, and two side panels that, when assembled, form a case, the case defining a storage volume having a height along a y-axis, a width along an x-axis, and a thickness along a z-axis. A plurality of position members may be attached to the interior surface of the bottom of the back panel and front panel, and the back panel may be configured to extend along an x-y plane. In this manner, the back panel has a top, a bottom, and two sides; each of the side panels has a top, a bottom, and two sides, and each side panel is configured to reversibly slide into an opening formed in the sides of the front panel and back panel. In this embodiment, the base panel, upon assembly, is configured to extend along an x-z plane, and the base panel may be positioned on top of a plurality of position members and between the side panels; wherein the top panel, upon assembly, is configured to extend along an x-z plane, positioned on top of the side panels.

In some embodiments, the kit may include one or more components having a plurality of locking pins and cleats. For example, the top panel, upon assembly, may be connected to the side panels by inserting a locking pin into a corresponding cleat installed on an interior surface of the side panels, and/or on a bottom surface of the top panel. In this manner, the locking cleats and pins restrict the top panel from movement relative to the side panels along the x, y, and z axes. It should be appreciated that the relative location of locking cleats may be varied from the demonstrative embodiments to achieve a desired configuration. In some embodiments, the locking pins may be self-tightening pins, thereby avoiding the need for using tools to properly assemble components.

In some embodiments, one or more side panels may be configured to define at least one positioning wedge. For example, the wedge may be on an interior bottom surface of the side panel. The positioning wedge includes a protrusion from the surface that defines a cavity shaped to receive a corresponding positioning wedge. The positioning wedge reversibly joins with a corresponding positioning wedge affixed to an interior side of the back panel or front panel. The corresponding positioning wedge includes a protrusion configured for insertion into the cavity and mating with the positioning wedge, and may be configured such that the mated position causes a firm connection between the two positioning wedges, thereby restricting the side panels from relative movement along the x and z axes. The positioning wedges may include beveled surfaces and lips to further create firm connections between the two positioning wedges.

In some embodiments, one or more of the side panels may be configured to define at least one receiver slot on the interior top surface of the side panel, such that the receiver reversibly mates with a corresponding locking wedge affixed to the interior side of the back panel or front panel to restrict the side panels from relative movement along the x and z axes. In some embodiments, a wedge of the locking wedge is generally trapezoidal.

In some embodiments, the kit may include one or more shelves extending along an x-z plane. Upon assembly of the case, the one or more shelves is removably attached to an interior portion of the side panels. A shelf may include one or more positioning wedges, positioning members, and/or locking pins or cleats, to reversibly connect to a corresponding connection member on an interior surface of the embodiment, should such connection be desired. As a result, a shelf may be connected using one or more of the connection mechanisms and approaches as described herein.

In some embodiments, the kit may include one or more door panels that, upon assembly, extend along an x-y plane when closed so as to seal all or a portion of the interior volume, and wherein the one or more door panels may be attached to one or more drawer runners attached to the interior surface of the side panels.

In some embodiments, one or more cleats may be attached to the side panels, such that upon assembly the side panels are further attached to the back panel and front panel by the one or more cleats and one or more locking pins.

In some embodiments, the top panel may incorporate other functional elements, such as, for example only, a sink, a cutting board, a saw, a grill, and a sewing machine.

In some embodiments, the unit may be a bathroom vanity, a television console, a table, a book shelf, a storage shelf, a cabinet, a bar table, an armoire, a case, a chiffonier, a closet, a dresser, a locker, a wardrobe, a bin, a vault, a buffet, and a sideboard.

In some embodiments, the present approach may involve a method of assembling a kit that is designed, when assembled, to form a unit of furniture. In a demonstrative embodiment for a case, the method may include providing a back panel, a top panel, a base panel, and two side panels, that, when assembled, form a case. The case may define a storage volume having a height along a y-axis, a width along an x-axis, and a thickness along a z-axis. The back panel may be configured to extend along an x-y plane, the back panel having a top, a bottom, and two sides, and each of the two side panels has a top, a bottom, and two sides extending along a y-z plane. Next, attaching the base panel by placing the base panel on top of at least one support pin such that the base panel extends along the x-z plane. Next, providing a plurality of position members attached to the bottom of the back panel and front panel, attaching the side panels to opposite ends of the back panel and the front panel by sliding the side panels into openings formed in the sides of the front panel and back panel, such that the side panels are at right angles to the back panel and front panel, attaching the top panel to an interior surface of the front panel and the back panel.

In some embodiments, the method may include providing a plurality of locking pins and cleats, wherein the top panel may be connected to the front and back panels by the plurality of locking pins and cleats installed on the top of the front and back panels and a bottom surface of the top panel, wherein the locking pins are installed through cleats into corresponding pin holes on the top of the front and back panels, and wherein the plurality of locking pins, cleats and pin holes restrict the top panel from relative movement along the x, y, and z axes.

In some embodiments, each of the side panels may be configured to define at least one positioning wedge on an interior bottom surface of the side panel, wherein the at least one positioning wedge on the interior bottom surface of the side panel reversibly joins with a second positioning wedge located on an interior side of the back panel or front panel to restrict the side panels from relative movement along the x and z axes.

In some embodiments, each of the side panels may be configured to define at least one receiving recess on the interior top surface of the side panel. The at least one recess on the interior top surface of the side panel may reversibly join with a locking wedge located on the interior side of the back panel or front panel to restrict the side panels from relative movement along the x and z axes.

In some embodiments, the method may include providing one or more shelves, such that the kit is configured so that the one or more shelves may be attached to an interior portion of the two side panels.

In some embodiments, the method may include providing one or more door panels that, upon assembly, are configured to be pivotally attached to the front portion of the side panels.

In some embodiments, the method may include providing one or more door panels that, upon assembly, extend along an x-y plane when closed so as to seal all or a portion of the case storage volume. The one or more door panels may be attached to one or more drawer runners attached to the interior surface of the side panels.

In yet another embodiment, a unit of furniture has a front panel, a back panel, and side panels all having an interior surface and top and bottom edges, and a base panel and a top panel. The unit of furniture also has a locking wedge coupled to the top edge of the front panel and a locking wedge coupled to the top edge of the back panel, a receiver coupled to the top edge of the side panels, and a plurality of locking pins, wherein the locking pins have a flex open bow and are self-tightening. When engaged, the locking wedge and receiver secure the side panels to the front and back panels.

DESCRIPTION

The following description includes various embodiments and method of carrying out exemplary embodiments of the present approach. The description is not to be taken in a limiting sense, and is made merely for the purpose of illustrating the general principles of the present approach. It should be appreciated that the various components, configurations, and features described herein may be combined to form other embodiments without departing from the present approach.

Figure 1:
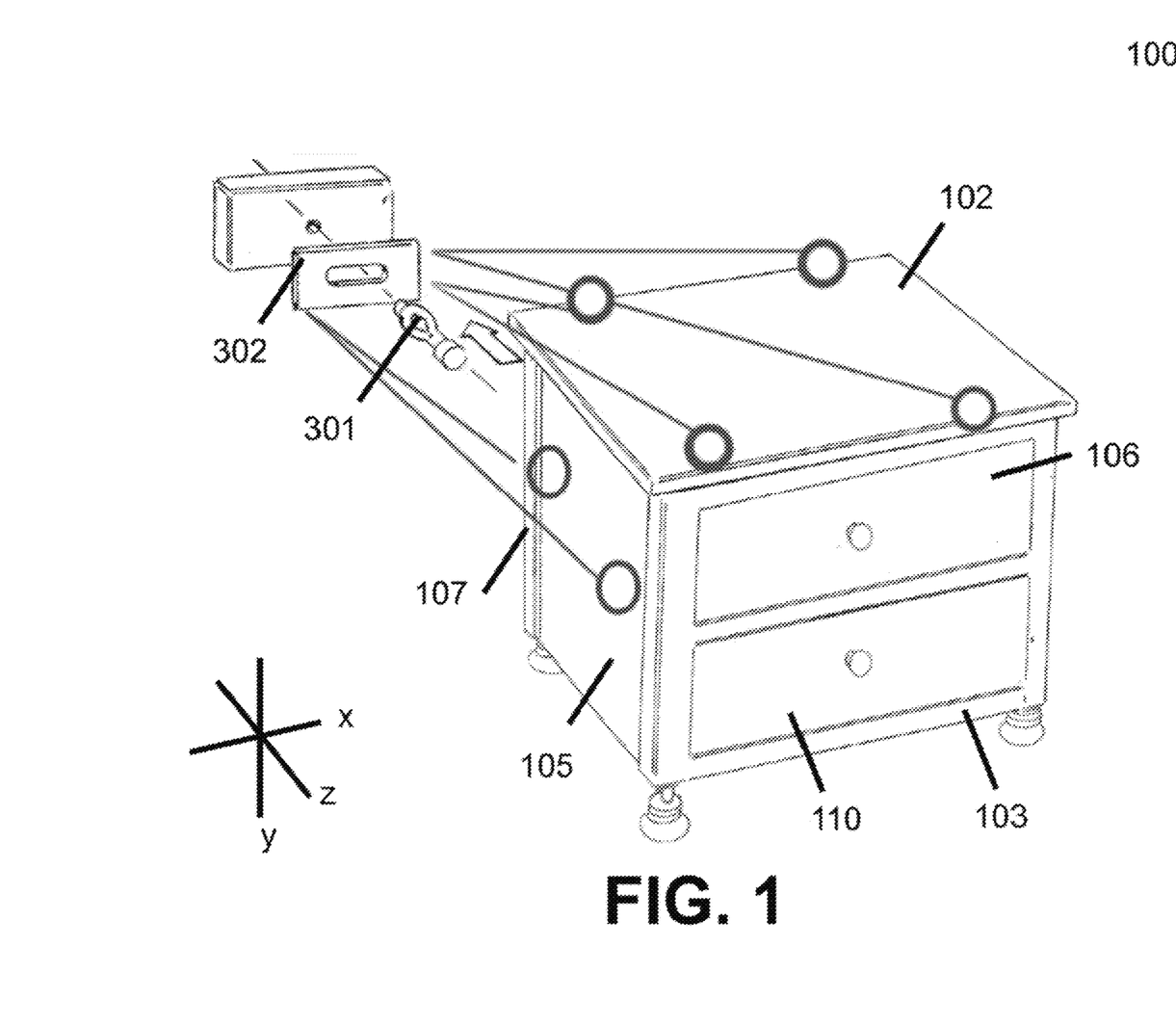
FIG. 1 is a front perspective view of an embodiment of an assembled kit with the reference axes shown and labeled.

FIG. 1 illustrates an embodiment of an assembled kit 100 with the reference axes shown and labeled. The assembled kit 100 includes a top panel 102, side panels 105, back panel 104 (not shown in FIG. 1), back frame 107, front face frame 103, and base panel 101 (not shown in FIG. 1). Optionally, one or more door or drawer panels 106 may be included to seal off all or a portion of the case storage volume formed by the top panel 102, the base panel 101, back panel 104, and the side panels 105, as is shown in FIG. 1. The one or more door or drawer panels 106 can be attached in any manner of ways known in the art. FIG. 1 shows one embodiment in which two drawer panels 110 close off the space of the enclosure.

In some embodiments, the panels may be manufactured from MDF, plywood, hardwood, metal, composite materials, plastic, or any material now known or later discovered.

Figure 2A:
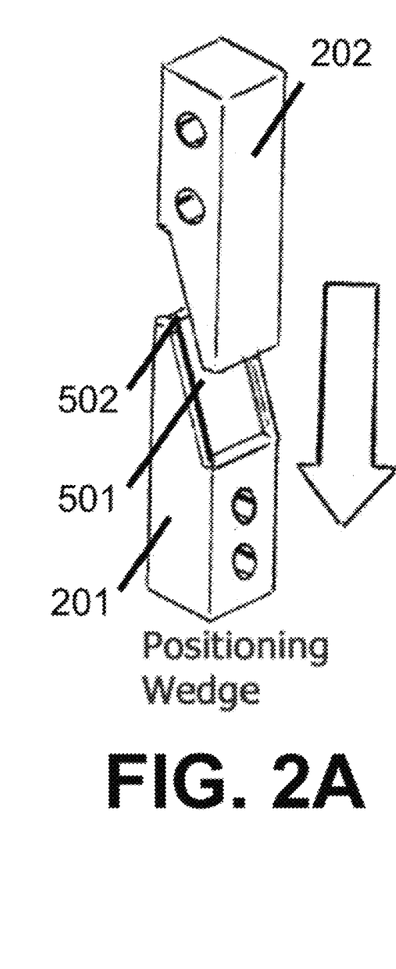
FIG. 2A is a front perspective view of the positioning wedge hardware according to one embodiment.

FIGS. 2A-2D illustrate demonstrative hardware used in the assembled kit. It should be appreciated that hardware may include positioning wedges, locking wedges, locking pins, and cleats, and further that hardware embodiments may not require any tools for installation. It should be appreciated that the present approach is not intended to be limited to these embodiments, as those of ordinary skill in the art will appreciate that modifications may be made without departing from the present approach. FIG. 2A illustrates how upper positioning wedge 202 reversibly joins with lower positioning wedge 201. Embodiments may include one or more pairs of positioning wedges to interconnect or position components. The positioning wedge includes a protrusion from the surface that defines a cavity shaped to receive a corresponding positioning wedge. The corresponding positioning wedge includes a protrusion configured for insertion into the cavity and mating with the positioning wedge, and may be configured such that the mated position causes a firm connection between the two positioning wedges, thereby restricting the panels from relative movement. The positioning wedges may include beveled surfaces 501 and lips 502 to assist with creating a firm connection between two positioning wedges to restrict the panels from relative movement. Beveled surface 501 of positioning wedge 202 may interact with a corresponding facing surface on positioning wedge 201. Depending on the desired fit, the components may rest against each other to ensure alignment. Alternately, a desired degree of contact or engagement may be used (i.e. "force fit"), such that the positioning wedges 201 and 202 have a tight fit that reduces potential movement. Beveled surface 501 may include a rim, as shown in FIG. 2A, to receive a corresponding protrusion in positioning wedge 202. Lip 502, shown in FIG. 4 on positioning wedge 201, may be included to improve the alignment of components, and also enhance the contact or engagement by sliding into a corresponding surface on the corresponding positioning wedge 202. In this manner, separate components may be reversibly joined, and advantageously without the use of tools. In some embodiments, the positioning wedge may be made from acrylonitrile butadiene styrene (ABS) or other thermoplastics.

It should be appreciated that embodiments of positioning wedges may vary from FIG. 2A. For example, the shapes and angles of the surfaces may vary, the pattern of interlocking between wedges may vary, among other features that may be modified without departing from the present approach.

Figure 2B:
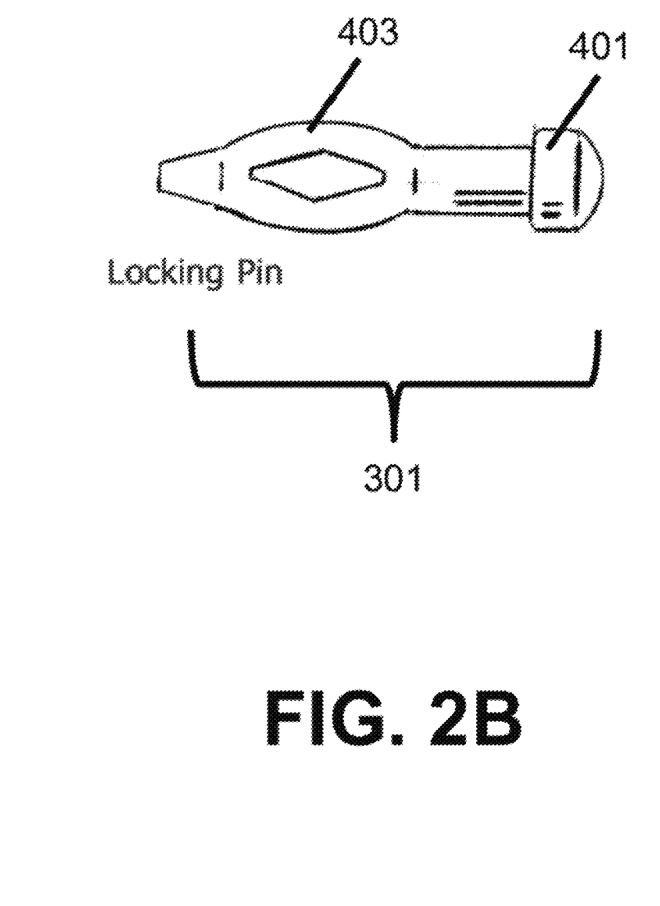
FIG. 2B is a side view of one embodiment of a locking pin.

FIG. 2B illustrates a side view of locking pin 301. The locking pin 301 includes a flexible open bow 403 that allows the locking pin 301 to self-tighten when pressure is applied to head portion 401. Upon insertion through a cleat 302 and into a corresponding pin hole 404 (shown in FIGS. 3 and 4) located in one of the panel members, bow 403 expands to prevent or reduce the likelihood of locking pin 301 dislodging from the pin hole 404. The bow compression fits tightly in the cleat locking in place the side panels 105 and the top panel 102. In some embodiments, the locking pin may be made from polyvinyl chloride (PVC) or other thermoplastics.

Figure 2C:
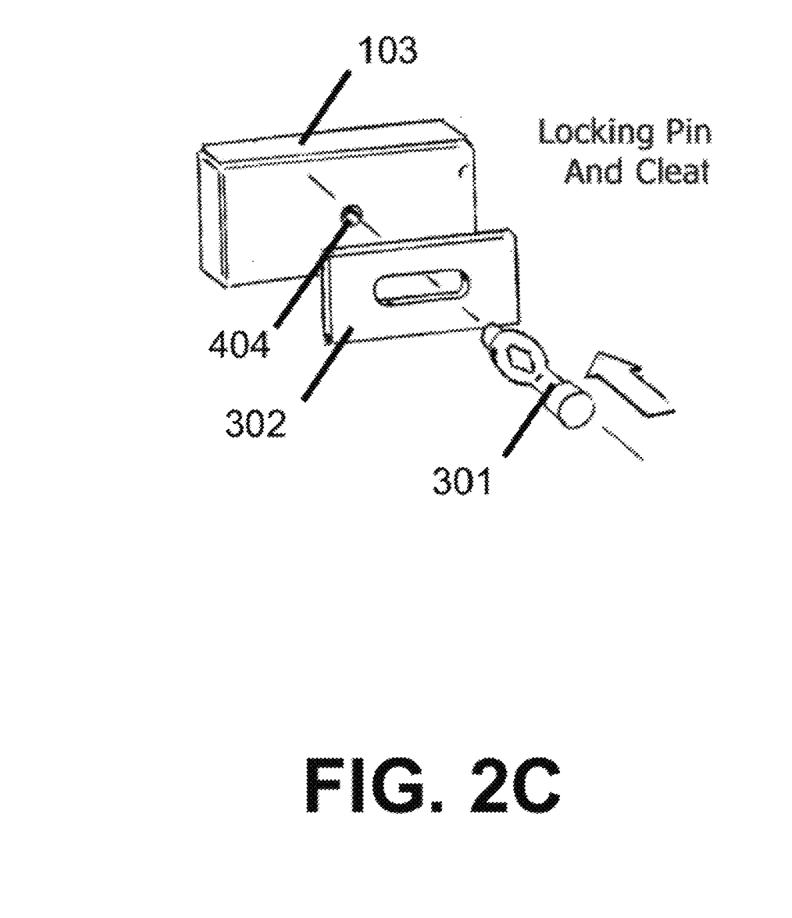
FIG. 2C is a front perspective view of a locking pin and cleat configuration according to one embodiment.

FIG. 2C illustrates how locking pin 301 joins with cleat 302 and is installed through pin hole 404. Cleat 302 extends from a surface of top panel 102 and may be aligned with pin hole 404 on back panel 107. In this example, the connection mechanism may be used to connect, for example, top panel 102 with back panel 107 (shown in FIGS. 3 and 4).

Figure 2D:
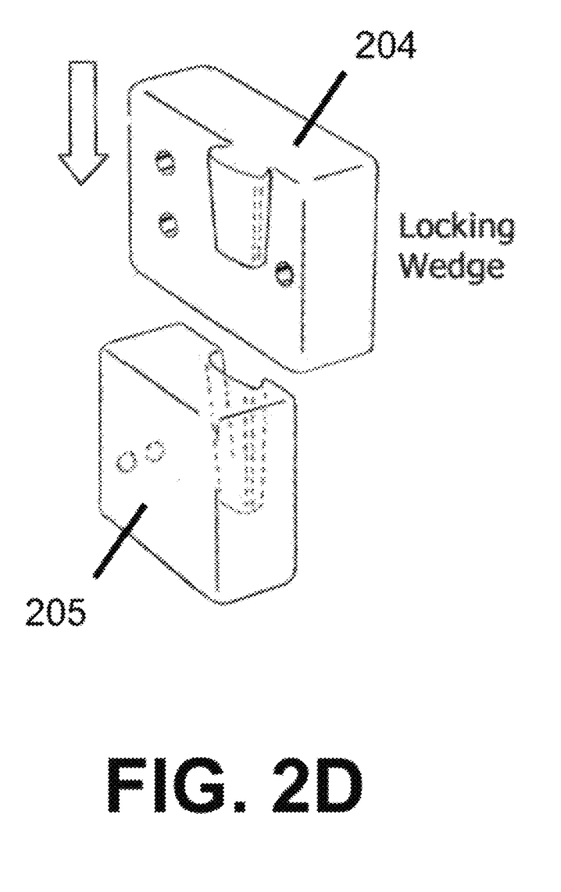
FIG. 2D is a front perspective view of the locking wedge hardware according to one embodiment.

FIG. 2D illustrates how upper locking wedge 204 reversibly joins with lower locking wedge 205. Alternately, the upper locking wedge and the lower locking wedge may be referred to as the receiver and the locking wedge. The locking wedge includes a protrusion from the surface that defines a cavity shaped to receive a corresponding locking wedge. The corresponding locking wedge includes a protrusion configured for insertion into the cavity and mating with the locking wedge, and may be configured such that the mated position causes a firm connection between the two locking wedges, thereby restricting the panels from relative movement. In some embodiments, the locking wedge may be made from ABS or other thermoplastics. It is envisioned that no tools may be required for installation of any of the hardware.

Figure 3:
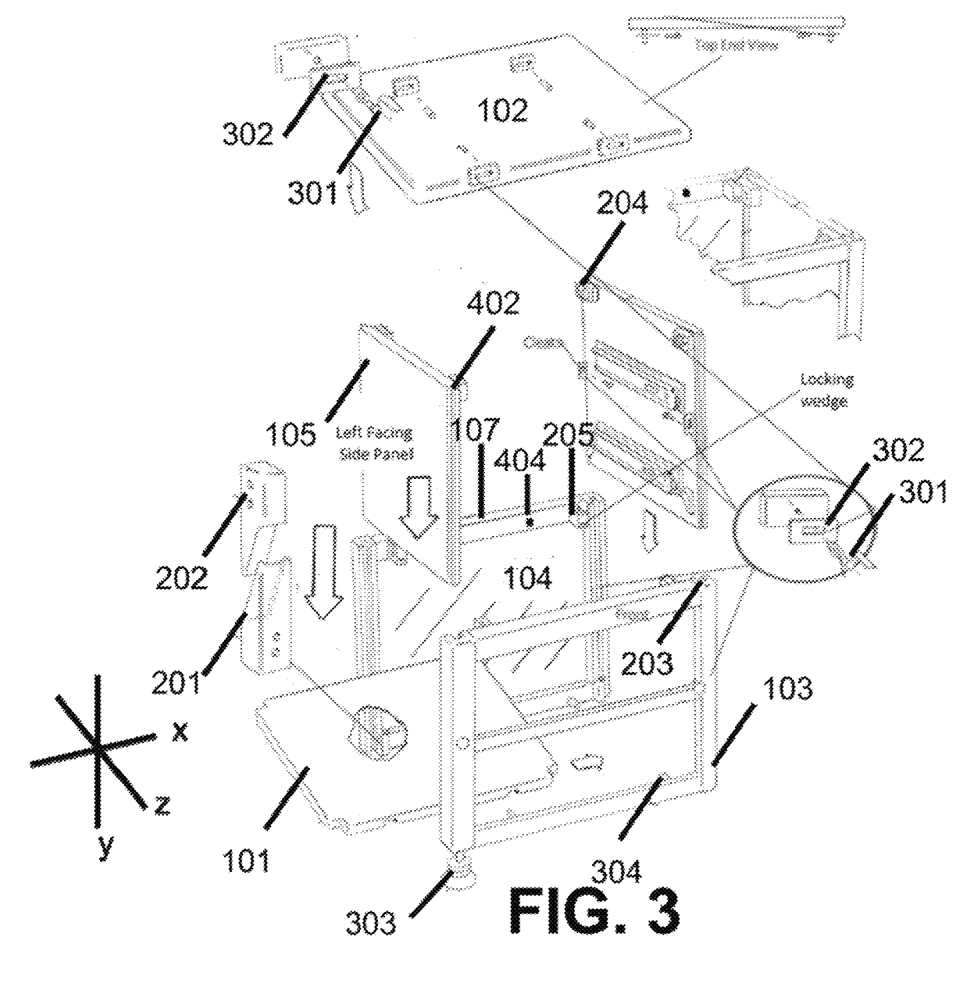
FIG. 3 is a front partial assembly view of a configuration that illustrates the position of the panels and hardware prior to assembly according to one embodiment.

FIG. 3 illustrates a disassembled view of the kit 100 in one demonstrative embodiment. A consumer may receive this arrangement in a shipped kit. Because the components may be disassembled, kits according to the present approach require minimal packing volume, which results in considerable transportation cost savings. In the embodiment shown in FIG. 3, the base panel 101 is placed on top of one or more position members 304 which are attached to a bottom surface of front face frame 103 and back frame 107. Side panel tongues 402 are configured to reversibly slide into a frame groove 203 formed in the interior surface of front face frame 103 and a frame groove 203 formed in the interior surface of the back frame 107. Alternately, the side panels 105 may not have side panel tongues 402. The side panels 105 may be at substantially right angles to front face frame 103 and back panel 104 and are substantially parallel to each other. In one embodiment, each of the side panels 105 is configured to define at least one upper positioning wedge 202 proximate a bottom edge of the side panel 105. The upper positioning wedge 202 may reversibly join with lower positioning wedge 201, which is affixed to an interior side of the back frame 107 or an interior side of front face frame 103 proximate a bottom edge. When engaged, the positioning wedges 201, 202 may restrict the side panels 105 from relative movement along the x and z axes. In one embodiment, the side panels 105 may be configured to define at least one upper locking wedge 204. The upper locking wedge 204 may reversibly join with lower locking wedge 205, which is affixed to an interior side of the back frame 107 or the interior side of front face frame 103, to restrict the side panels 105 from relative movement along the x and z axes.

In some embodiments, the kit comprises a plurality of locking pins 301 and cleats 302. The locking pins 301 may be installed through the cleats 302 and into pin holes 404 located on the interior surface of the back panel frame 107 and front panel frame 103. The cleats 302 may be installed on the interior bottom surface of top panel 102, and the locking pins 301 may be inserted into cleats 302 to restrict the top panel 102 from relative movement along the x, y and z axes. In this embodiment, top panel 102 rests on upper surfaces of front, back, and side panel frames. However, it should be appreciated that the connection mechanism may be used to provide support along the y axis as well. The cleats 302 may also be installed on the interior surface of side panels 105 in the x-y plane, and may be substantially perpendicular to a front face. The cleats 302 may also be proximate side edges of the side panels 105. The locking pins 301 may be inserted into cleats 302 to restrict the side panels 105 from relative movement along the x, y, and z axes. The consumer may need only to apply force to the head portion 401 of the locking pin 301 to complete this portion of the assembly and create a resilient, stabilized unit. In some embodiments, the kit comprises a plurality of bun feet 303. The bun feet 303 may be installed on the bottom surface of front face frame 103 and back frame 107. The embodiments show example configurations, though it should be appreciated that the present approach allows for locking pins, cleats, and pin holes to be positioned in different locations or alternate configurations. For example, cleats may extend from top and bottom panel frames and corresponding pin holes may be located in the top and bottom panels. Similarly, some embodiments may feature both a cleat and a pin hole on the same surface (e.g., a top panel), such that an adjoining surface (e.g., a front panel frame) also has a pin hole and cleat. In such an embodiment, one locking pin would insert through the top panel cleat into the front panel frame pin hole, and another locking pin would insert through the front panel frame cleat into the top panel pin hole. Likewise, a locking pin may be inserted from an exterior surface such that the head portion remains visible unless covered, or from an interior surface such that the locking pin is not visible form the outside, depending on the embodiment. Those of ordinary skill in the art should recognize the range of potential configurations.

Figure 4:
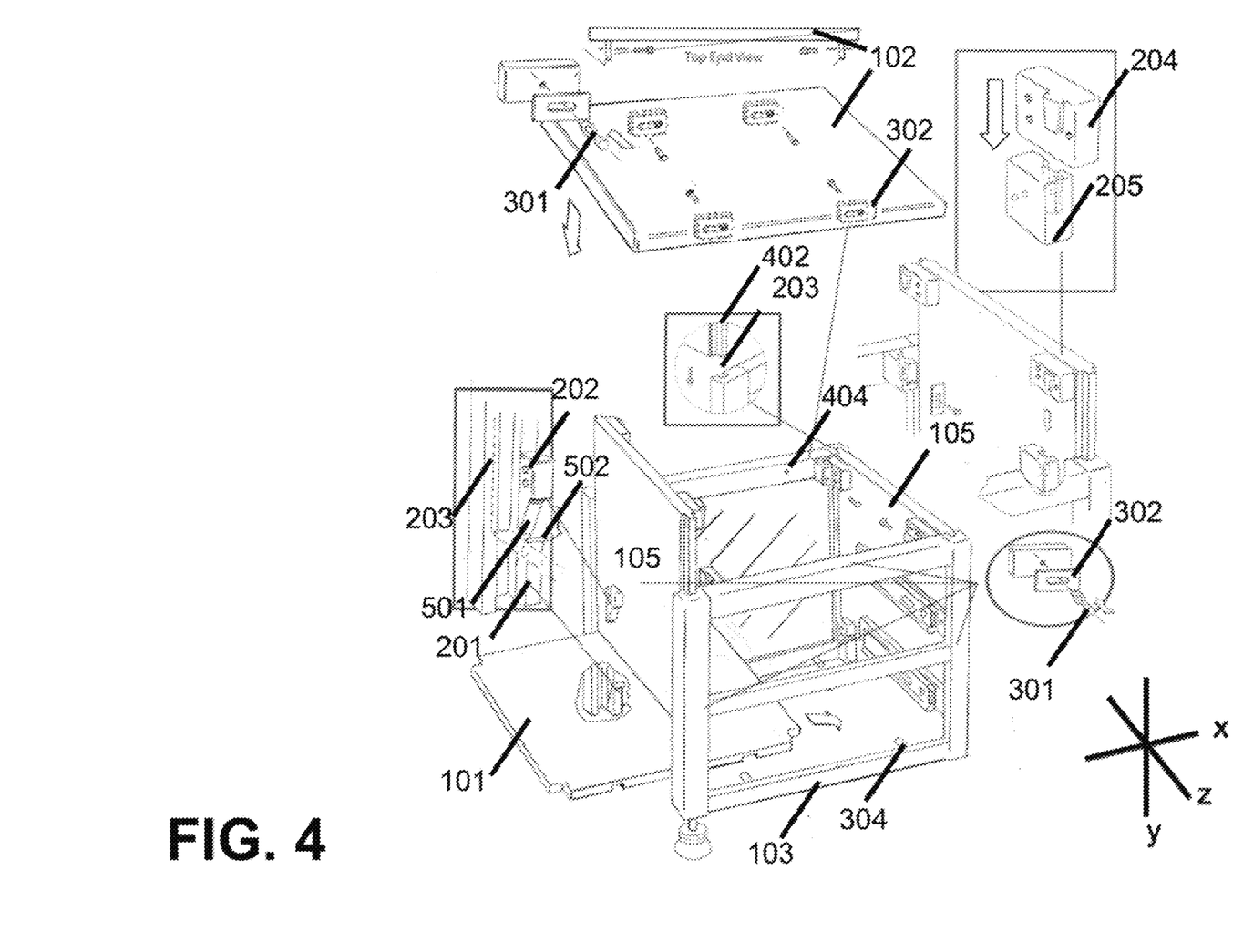
FIG. 4 is a front partial assembly view of a configuration that illustrates the position of the panels and hardware upon placement of the side panels in an embodiment.

FIG. 4 illustrates a partially assembled view of the kit 100 according to one embodiment. One side panel 105 is fully placed in position between the back frame 107 and front face frame 103. The position members 304 are shown in FIGS. 3 and 4 as pins, but other embodiments of position members, such as biscuits, dowels, and splines may be acceptable alternatives, depending on the application and type of furniture. It should be appreciated that one or more position members may be used in an embodiment, if desired. No tools and little, if any, know-how may be required. In some embodiments, the kit may include one or more door panels that, upon assembly, extend along an x-y plane when closed so as to seal all or a portion of the interior volume, and wherein the one or more door panels may be pivotally attached to a front portion of the side panels when assembled. In other embodiments, the kit may include one or more door panels that, upon assembly, extend along an x-y plane when closed so as to seal all or a portion of the interior volume, and wherein the one or more door panels may be attached to one or more drawer runners attached to the interior surface of the side panels.

Figure 5:
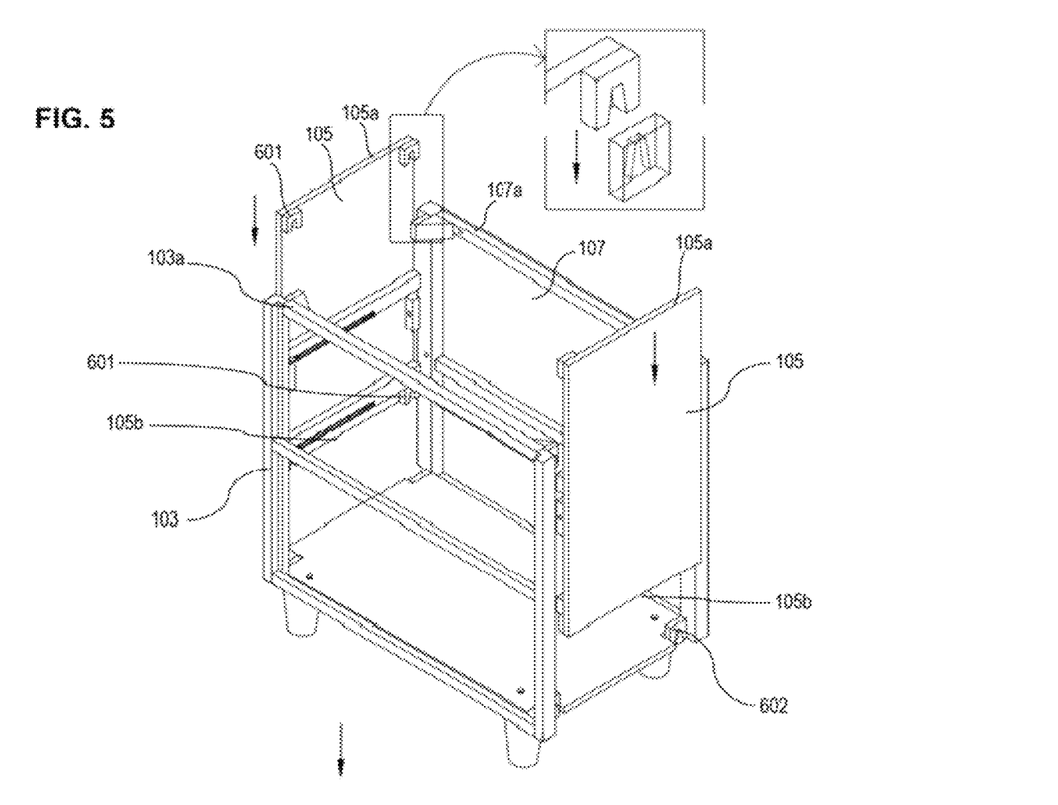
FIG. 5 is a front partial assembly view that illustrates the position of the panels and hardware prior to assembly according to one embodiment.

FIG. 5 shows an alternate embodiment wherein a positioning wedge is not used, but rather a locking wedge 602 and a receiver 601. The receiver 601 may be coupled proximate a top edge 105a of the side panel. Alternately, the receiver 601 may be coupled proximate a bottom edge 105b of the side panel. The receiver 601 may interact with the locking wedge 602 coupled proximate a top edge 107a of the back panel. The locking wedge 602 may alternately be coupled proximate a top edge 103a of front panel. In some embodiments, there may be four locking wedges 602 coupled to the front panel 103 proximate a bottom right corner, a bottom left corner, a top right corner, and a top left corner. There may also be four locking wedges 602 coupled to the back panel 107 proximate a bottom right corner, a bottom left corner, a top right corner, and a top left corner. In some embodiments, the locking wedge 602 is coupled to a corner block. There may be four receivers 601 coupled to each side panel proximate a bottom right corner, a bottom left corner, a top right corner, and a top left corner. A front face of the locking wedge 602 may be approximately the same height and width as a front face of the receiver 601.

The front face of the locking wedge 602 may be in contact with the front face of the receiver 601 when a wedge is engaged. The wedge of the locking wedge 602 may have a top and a bottom that are substantially perpendicular to the front face of the locking wedge 602. The wedge of the locking wedge 602 extends outwardly from the front face of the locking wedge 602. The bottom of the wedge may be even with a bottom of the locking wedge 602. The wedge may be substantially trapezoidal in shape. The receiver may have a trapezoidal recess extending inwardly from the front face. The trapezoidal recess may pair with the wedge. Alternately, the 601 receiver may define a trapezoidal recess extending inwardly from the front face. In some embodiments, the locking wedge 602 and receiver 601 securely fasten the side panels 105 such that no rails or other attachment devices are required. In some embodiments, the locking wedges 602 and receivers 601 are the only fastening means securing the side panels 105 to the front panel 103 and the back panel 107.

The locking wedge 602 shown in FIG. 5 may be preferred because the trapezoidal shape combines the benefits of the positioning wedge and the locking wedge of FIGS. 2A and 2D. This may lead to a more secure fit, whereas the positioning wedge may require a pin to secure the wedges into position. Further, the combination of locking wedge 602 and receiver 601 can be used to in place of locking wedge and positioning wedge of FIGS. 2A and 2D, such that the locking wedge can be used at the top of the front panel and back panel, as well as the bottom of the front panel and back panel.

Figure 6:
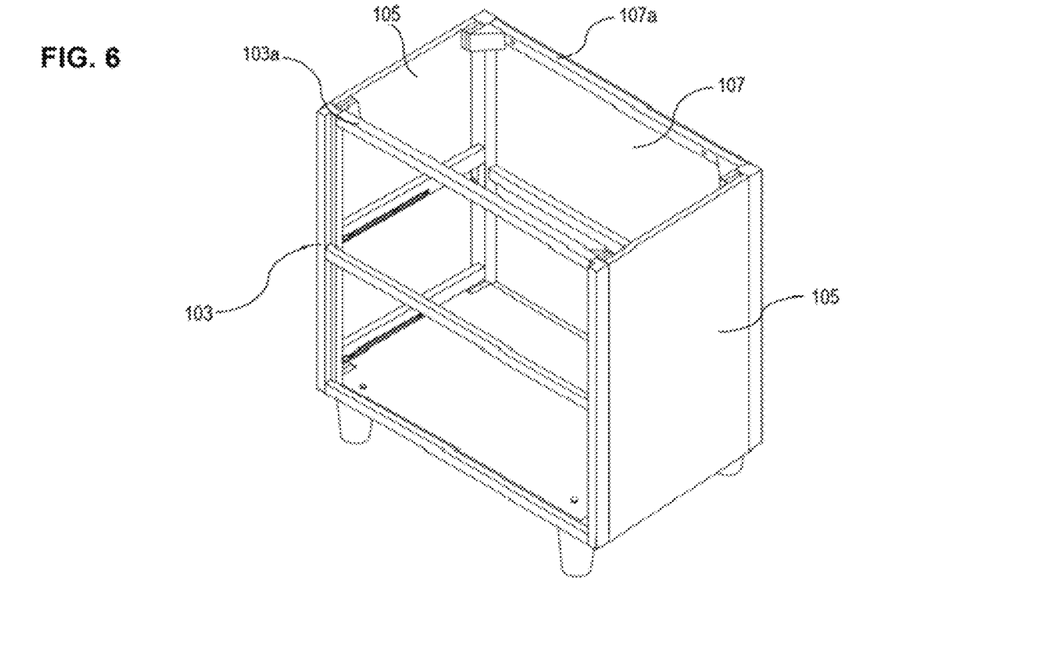
FIG. 6 is a front partial assembly view that illustrates the position of a front, back, base, and side panels upon partial assembly according to one embodiment.

FIG. 6 shows the alternate embodiment of the cabinet assembly. The side panels 105 have been slid into place, and the locking wedge 602 and the receiver 601 may be engaged.

Figure 7:
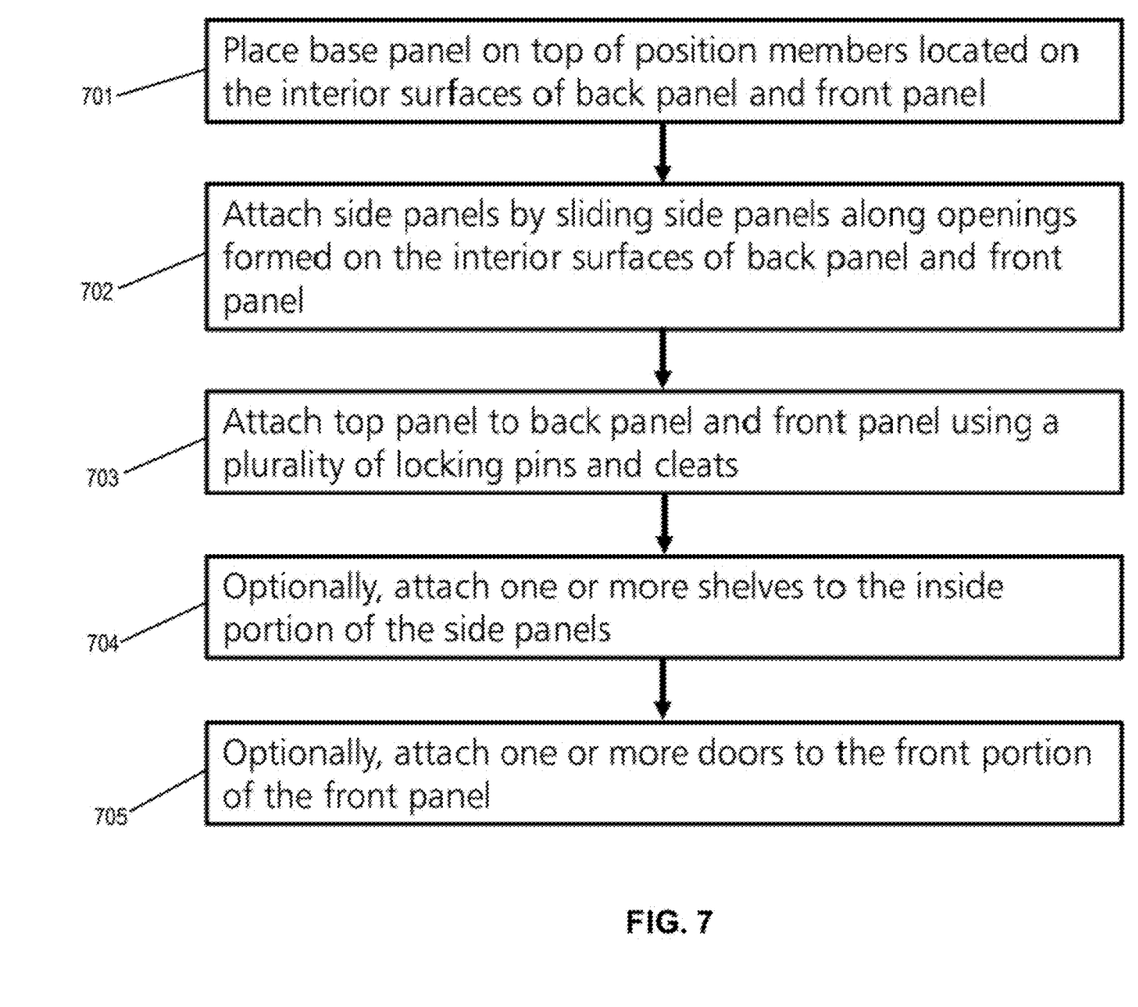
FIG. 7 is a flow chart outline of the steps of the method of assembly according to one embodiment of the present approach.

FIG. 7 illustrates a flow chart outline of the steps of the method of assembly according to an embodiment of the present approach. These steps illustrate the information that may be found on a kit assembly instruction page or manual. In the first step 701, a consumer places the base panel 101 on top of position members 304 located on the interior surfaces of back frame 107 and front face frame 103. In the next step 702, the consumer attaches the side panels 105 by sliding the side panel tongues 402 along the frame grooves 203 formed on the interior surfaces of the back frame 107 and front face frame 103. In the next step 703, the consumer attaches the top panel 102 to the back panel 104 and front face frame 103 using a plurality of locking pins 301 and cleats 302. Optionally, as is shown in step 704, the consumer may attach one or more shelves or drawers to the inside portion of the side panels 105. Optionally, as is shown in step 705, the consumer may attach one or more door or drawer panels 110 to a front portion of the front face frame 103.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present approach may be embodied in other specific forms without departing from the spirit or essential characteristics thereof. The disclosed embodiments are therefore to be considered in all respects as illustrative and not restrictive, the scope of the present approach being indicated by the claims of the application rather than by the foregoing description, and all changes which come within the meaning and range of equivalency of the claims are therefore intended to be embraced therein. One of ordinary skill in the art should appreciate that numerous possibilities are available, and that the scope of the present approach is not limited by the embodiments described herein.

What is claimed is:

1. A furniture assembly kit comprising:
 a back panel, a top panel, a base panel, and two side panels that, when assembled, form a case, the case defining a storage volume having a height along a y-axis, a width along an x-axis, and a thickness along a z-axis; and
 a plurality of position members attached adjacent a bottom surface of the back panel and a bottom surface of a front panel,
 wherein the back panel is configured to extend along a x-y plane, the back panel having a top, a bottom, and two sides;
 wherein each of the side panels is configured to extend along a y-z plane and has a top, a bottom, and two sides and is configured to slide into proximate the front panel and the back panel;
 wherein the base panel, upon assembly, is configured to extend along an x-z plane, and the base panel may be positioned on top of the plurality of position members and between the side panels;
 wherein the top panel, upon assembly, is configured to extend along an x-z plane, proximate tops of the side panels;
 wherein each of the side panels further comprises one or more receivers, each said receiver comprising a downward-facing opening disposed on an interior surface of the side panel, and further wherein the one or more receivers are each sized and shaped to securely receive via the downward-facing opening a corresponding locking wedge disposed on one of the front panel and the back panel when the side panel is translated in a downward, vertical direction along the y-axis, thereby restricting the side panels from movement relative to the front and back panels.

2. The kit of claim 1, further comprising a plurality of locking pins and cleats, wherein the top panel, upon assembly, may be connected to the back panel and the front panel by the plurality of locking pins and cleats installed on the top panel, wherein the plurality of locking cleats and pins restrict the top panel from relative movement.

3. The kit of claim 2, further comprising a plurality of locking pins and cleats, wherein the side panels, upon assembly, may be connected to the back panel and the front panel by the plurality of locking pins and cleats installed on an interior surface of the side panel, wherein the plurality of locking cleats and pins restrict the side panels from relative movement.

4. The kit of claim 1, wherein each of the side panels has at least one positioning wedge coupled to an interior bottom surface of the side panel, wherein the at least one positioning wedge on the interior bottom surface of the side panel reversibly joins with a second positioning wedge affixed to an interior side of the back panel or the front panel to restrict the side panel from relative movement.

5. The kit of claim 1, further comprising at least one locking pin, wherein the at least one locking pin is a self-tightening pin.

6. The kit of claim 5, further comprising one or more cleats attached to the side panels, wherein upon assembly the side panels are further attached to the back panel and the front panel by means of the one or more cleats and the at least one locking pin.

7. The kit of claim 1, wherein the kit comprises one or more shelves extending along an x-z plane and wherein, upon assembly, the one or more shelves is removably coupled to an interior portion of the side panels.

8. The kit of claim 1, further comprising one or more door panels that, upon assembly, extend along an x-y plane when closed so as to seal all or a portion of the storage volume of the case, and wherein the one or more door panels may be coupled to one or more drawer runners attached to an interior surface of the side panels.

9. The kit of claim 1, wherein the kit, when assembled, forms a unit of furniture selected from the group consisting of a table, a book shelf, a storage shelf, a cabinet, a bar table, an armoire, a case, a chiffonier, a closet, a dresser, a locker, a wardrobe, a bin, a vault, a buffet, and a sideboard.

10. A method of assembling a kit that is designed, when assembled, to form a unit of furniture, the method comprising:
providing a back panel, a top panel, a base panel, and two side panels that, when assembled, form a case, the case defining a storage volume having a height along a y-axis, a width along an x-axis, and a thickness along a z-axis, wherein the back panel is configured to extend along an x-y plane, the back panel having a top, a bottom, and two sides, and wherein each of the two side panels has a top, a bottom, and two sides;
providing a plurality of position members attached to a bottom of the back panel and a bottom of a front panel;
providing a locking wedge and a receiver, wherein when engaged the locking wedge and the receiver interact in the same plane, wherein each of the side panels comprises at least one said receiver, each said receiver comprising a downward-facing opening disposed on an interior surface of the side panel, and further wherein the receivers are each sized and shaped to securely receive via the downward-facing opening one said locking wedge disposed on one of the front panel and the back panel when the side panel is translated in a downward, vertical direction along the y-axis, thereby restricting the side panels from movement relative to the front and back panels;
attaching the side panels to opposite ends of the back panel and the front panel by sliding the side panels into openings formed in the sides of the front panel and the back panel, such that the side panels are at right angles to the back panel and the front panel, while translating the side panel in the downward, vertical direction along the y-axis to engage the locking wedge and the receiver in the same plane,
attaching the top panel to an interior surface of the front panel and the back panel; and
attaching the base panel by placing the base panel on top of at least one said position member such that the base panel extends along the x-z plane and rests above the position members.

11. The method of claim 10, further comprising providing a plurality of locking pins and cleats, wherein the top panel may be connected to the side panels by the plurality of locking pins and cleats installed on a top surface of the side panels and a bottom surface of the top panel, and wherein the plurality of locking cleats and pins restrict the top panel from relative movement.

12. The method of claim 11, wherein each of the side panels has at least one positioning wedge coupled to an interior bottom surface of the side panel, wherein the at least one positioning wedge on the interior bottom surface of the side panel reversibly joins with a second positioning wedge affixed to an interior side of the back panel or the front panel to restrict the side panel from relative movement, wherein the locking wedge has a front face and a wedge, the wedge being generally trapezoidal in shape and configured to mate with the receiver.

13. The method of claim 10, wherein each of the side panels has at least one receiver coupled to an interior top surface of the side panel, wherein the at least one receiver on the interior top surface of the side panel reversibly joins with a locking wedge affixed to an interior side of the back panel or the front panel to restrict the side panel from relative movement.

14. The method of claim 10, further comprising one or more shelves, and wherein the kit is configured so that the one or more shelves may be attached to an interior portion of the two side panels.

15. The method of claim 10, further comprising providing one or more door panels that, upon assembly, are configured to be pivotally attached to the front panel.

16. The method of claim 10, further comprising one or more door panels that, upon assembly, extend along an x-y plane when closed so as to seal all or a portion of the storage volume of the case, and wherein the one or more door panels may be attached to one or more drawer runners attached to the an interior surface of the side panels.

17. A unit of furniture comprising:
a front panel, a back panel, and side panels, the front panel, the back panel, and the side panels each having an interior surface and top and bottom edges;
a frame groove in the front panel and a side panel tongue in the side panels to facilitate sliding the side panels into position proximate the front panel;
a base panel and a top panel;
a locking wedge coupled adjacent the top edge of the front panel, wherein each of the side panels further comprises one or more receivers, each said receiver comprising a downward-facing opening disposed on an interior surface of one of the side panels, and further wherein the one or more receivers are each sized and shaped to securely receive via the downward-facing opening one said locking wedge having a trapezoid protrusion, the locking wedge disposed on one of the front panel and the back panel when the side panel is translated in a downward, vertical direction along the y-axis, thereby restricting the side panels from movement relative to the front and back panels;
at least one said receiver coupled to the top edge of each of the side panels, wherein one said locking wedge is configured to be received by each said receiver, wherein each said receiver has a recess defined by an interior surface of the receiver and said downward-facing opening for mating with one said locking wedge, wherein when engaged a rear face of each said receiver and a rear face of a corresponding said locking wedge are generally parallel to one another; and
wherein when engaged, each said locking wedge and each said receiver secure the side panels relative to the front and back panels.

* * * * *